United States Patent [19]

Knowles

[11] 4,015,015
[45] Mar. 29, 1977

[54] CHEMICAL FIRE ALARM

[75] Inventor: Richard Norris Knowles, Wilmington, Del.

[73] Assignee: E. I. Du Pont de Nemours and Company, Wilmington, Del.

[22] Filed: July 15, 1975

[21] Appl. No.: 596,191

Related U.S. Application Data

[63] Continuation-in-part of Ser. No. 300,811, Oct. 25, 1972, abandoned, which is a continuation-in-part of Ser. No. 279,832, Aug. 11, 1972, abandoned.

[52] U.S. Cl. .................................... 424/324; 5/1; 116/67 R; 116/114 F; 297/463; 424/244; 424/267; 424/272; 424/274; 424/302; 424/304; 424/322; 424/330
[51] Int. Cl.$^2$ ............ A61K 31/165; A61K 31/135; A61K 31/445
[58] Field of Search ............ 424/330, 324, 10, 244, 424/267, 274, 322, 302, 304, 272; 116/114, 67

[56] References Cited

UNITED STATES PATENTS

| | | | |
|---|---|---|---|
| 2,203,051 | 6/1940 | Green | 116/114 F |
| 2,554,764 | 5/1951 | Wilkerson | 116/114 F |
| 3,671,642 | 6/1972 | Knowles | 424/320 |
| 3,679,805 | 7/1972 | Knowles | 424/320 |
| 3,686,415 | 8/1972 | Knowles | 424/320 |

*Primary Examiner*—Sam Rosen

[57] ABSTRACT

A system for warning people of a fire hazard comprising a flammable substrate having bound thereto a non-vaporous organic compound of molecular weight below 400, which forms a respiratory irritant upon being vaporized. The organic compound remains bound to the substrate in non-vaporous form under normal conditions of use, but is vaporized from the surface upon exposure to temperature no lower than about 200° C.

11 Claims, No Drawings

CHEMICAL FIRE ALARM

CROSS REFERENCE TO RELATED APPLICATIONS

This application is a continuation-in-part of application Ser. No. 300,811, filed Oct. 25, 1972 and now abandoned, which is a continuation-in-part of application Ser. No. 279,832, filed Aug. 11, 1972 and now abandoned.

BACKGROUND OF THE INVENTION

Each year many people lose their lives in fires. The majority of these people are killed by high carbon monoxide levels or low oxygen levels rather than by the direct action of the fire itself.

Only about 1% of the homes in the U.S. have fire alarm systems. Where fire alarm systems are used, they are generally based on various heat sensing devices. These range from central systems having heat detectors strategically placed throughout a building to individual battery or gas operated devices which can be strategically located. Since these systems rely on heat sensing devices, smoldering fires are often undetected, thus allowing carbon monoxide and other combustion products to build up to toxic levels, i.e., levels causing people to lose consciousness and die.

Some types of fires are often associated with very heavy smoke production. For example, smoldering carpets, upholstery, bedding and insulation can produce large quantities of smoke during the early stages of a fire. Lethal levels of carbon monoxide and other combustion products can quickly develop from such fires if they remain undetected.

There is a need for an inexpensive, reliable system for alerting people to the presence of smoke. The word smoke as used herein is intended to include both toxic gases and suspended, particulate matter. The alerting system also needs to be simple, maintenance-free and have a long, useful life.

In addition to alerting people to smoke hazards, the alarm chemicals can be incorporated into materials which may be accidentally subjected to excessive heat. Thus they can be incorporated into electrical cables, TV on-off switches, heating pads and the like. These substrates are occasionally exposed to excessive heat, and when this occurs, the alarm chemicals will be released thereby warning people of the hazard.

BRIEF SUMMARY OF THE INVENTION

I have discovered that a chemical fire and heat alarm can be produced by the incorporation of certain chemicals into substrates which normally produce smoke at an early stage in a fire. These chemicals are liberated by the smoldering material, and they alert sleeping or otherwise inattentive people to the presence of the fire. The chemicals can also be incorporated into electrical insulation or the housings for electrical devices which are subject to accidental electrical overloads. Then in the event of an overload, the alarm chemical would be released by the overheated substrate alerting people to the dangerous situation. These chemicals are respiratory irritants, and normally gain people's attention by causing them to sneeze or cough. The alarm chemicals produce these physiological responses when present in the air at a level of only a few parts per million, thus alerting people to the presence of the hazardous situation before carbon monoxide and other combustion products reach toxic levels. Compounds such as o-chlorobenzylidene malononitrile or cis-N-acetyl-4-cyclohexylmethylcyclohexylamine are examples of the kinds of chemicals which can be used as chemical heat and fire alarms.

DESCRIPTION OF THE INVENTION

As set forth above, this invention relates to a method of alerting people to the presence of a heat or fire hazard by the incorporation of certain alarm chemicals into substrates. The alarm chemical would be volatilized in the event of a fire or other temperature excess thereby alerting sleeping or otherwise inattentive people to the presence of the fire. The volatilized heat and fire alarm chemicals are respiratory irritants which produce an unpleasant response in the tissues of the nose, mouth and throat, normally causing people to sneeze or cough when present in the atmosphere. This unpleasant response is described by various people as a stinging or burning or astringent sensation or a combination of these.

In order for a heat and fire alarm chemical to be most effective it must be reliable, economical, safe, released only on demand, resistant to air oxidation, resistant to leaching by water or other solvents which may be encountered in normal use, simple and maintenance-free. In addition to these properties the alarm chemical must be a respiratory irritant which will normally cause people to cough or sneeze at low levels in the atmospher, and their presence must be detected well before carbon monoxide and other toxic combustion products reach lethal levels. In addition to these properties, the alarm chemicals must also be compatible with the substrates in which they are used.

The alarm chemicals are released under conditions of excessive heat or under smoldering conditions. By excessive heat it is meant a temperature above ambient or the normal operating temperature; generally this will mean above 200°–250° C. By smoldering it is meant a slow combustion which produces carbon monoxide and other toxic gases.

In order for the heat and fire alarm chemicals to meet the above criteria, they must have low vapor pressures under normal temperature conditons. The vapor pressure, heat of vaporization, molecular weight of the chemicals and the temperature are all interrelated phenomena in the operation of the chemical heat and fire alarm. In general, as molecular weights increase, vapor pressures tend to decrease. The vapor pressures and heats of vaporization of many of the compounds which can serve as chemical alarms are not readily available. Thus their molecular weights provide the simplest criteria for selecting compounds for use as chemical fire alarms.

Compounds whose molecular weights are low will have a vapor pressure which is sufficiently high to cause the chemical fire alarm material to slowly volatilize, shortening the useful life of the system. Compounds which are too volatile would also be released under nonfire conditions, thereby reducing the effectiveness of the system. Generally, compounds having a low molecular wieght, i.e., below 150, will need to be modified to reduce their volatitity. Thus with compounds having a molecular weight below 150, techniques such as microencapsulation will need to be used. Microencapsulation can also be employed with higher molecular weight compounds, but it is not necessary.

On the other hand, compounds whose molecular weights are too high will not vaporize at a sufficiently high rate, thereby reducing their effectiveness as alarm materials. Not only will the concentration of these compounds be too low because of the slow rate of vaporization, the compounds are likely to be decomposed before they can be completely released. Generally, compounds having a molecular weight above 400 will not be volatile enough to be effective chemical fire alarms.

Encapsulation of heat and fire alarm chemicals can be used to improve their safety. Encapsulation will lower their effective vapor pressures; this will tend to reduce exposure problems, i.e., when the chemical is being prepared and also during use. Microencapsulation will be particularly important for the lower molecular weight alarm compounds.

A variety of techniques can be used to encapsulate the heat and fire alarm chemicals. Useful techniques are described by James E. Flinn and Herman Nock, Chemical Engineering, Dec. 4, 1967, pages 171–178, and also by M. W. Ranney, Microencapsulation Technology, 1969, Noyes Development Corporation, Park Ridge, New Jersey. The particular technique to be used will be apparent to one skilled in the art depending upon the properties of the alarm chemical, the substrate and the end use.

Ideally, the encapsulation material should form a continuous barrier or coating around the alarm chemical in order to reduce its effective vapor pressure. The material must be such that it will release the alarm chemical at temperatures which are low enough to provide adequate warning of overheating or burning.

The useful chemicals must possess the physiological property of irritating mucous membranes; this normally causes people to cough and/or sneeze. Thus, they should be active as respiratory irritants when present in the atmosphere at concentrations as low as 0.01 ppm. Since these compounds are respiratory irritants their concentration in the air after release should not exceed an upper limit which will vary for each compound, but generally an upper limit of 100 ppm is safe although with some of these compounds, more can be present.

Since the useful chemical heat and fire alarms are combustible organic compounds, they tend to be consumed in open flames. This tends to increase their safety by reducing the levels generated during the course of an open fire as distinquished from a smoldering fire.

The following compounds are examples of the types of chemicals that are respiratory irritants which can be used as chemical heat and fire alarms:

Compounds of the following formula:

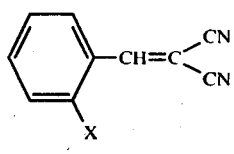

where X is fluorine, chlorine, bromine, nitro, cycano, or hydroxy. Preferred is the compound where X is chlorine, i.e., o-chlorobenzylidene malononitrile. The preparation of these compounds is described in British Pat. No. 967,660 and in Corson, Stoughton, J. Am. Chem. So., 50 2828,2830.

Compounds of the following formula:

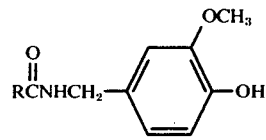

where R is alkyl or alkenyl of 7 to 12 carbon atoms. Preferred is the compound where R is

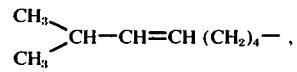

i.e., Capsaicin.

These compounds can be prepared as described in Royle, Lapworth, J. Am. Chem. Soc., 115, 1109 (1919); Nelson, Dawson, J. Am. Chem. Soc., 45 2179 (1923); Brodner, Sherrill, U.S. Pat. No. 1,503,631; m-Phenylenediisothiocyanate Billeter, Steiner, Ber., 20, 230; Various allyl derivatives such as allylisothiocyanate and allylaldehyde.

Also useful are various cis-4-substituted cyclohexylamine derivatives. These compounds are described, and processes for their preparation are described in the following references:

1. Knowles, U.S. pat. application Ser. No. 635,306, filed Apr. 20, 1967, entitled "N-acylcyclohexylamines", now U.S. Pat. No. 3,691,236, describes N-acyl-4- higher alkyl-substituted-cyclohexylamines of the formula:

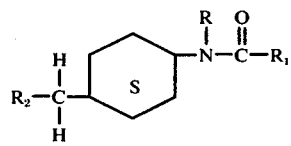

where
R is hydrogen, methyl or ethyl;
R₁ is hydrogen or alkyl of 1 through 4 carbon atoms; and
R₂ is straight chain or branched alkyl of 3 through 8 carbon atoms.

Preferred compounds of this class are N-acetyl-cis-4-n-butylcyclohexylamine and N-acetyl-cis-4-n-hexylcyclohexylamine.

2. Knowles and Arthur U.S. pat. application Ser. No. 635,305, filed Apr. 20, 1967, entitled "Certain N-acetylcyclohexyl Amines", now U.S. Pat. No. 3,679,805, describes N-acyl-4-cycloalkyl-, bicycloalkyl-, and tricycloalkyl substituted-cyclohexylamines of the formula:

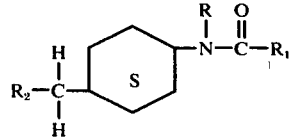

where
R is hydrogen, methyl or ethyl:
R₁ is hydrogen or alkyl of 1 through 4 carbon atoms; and R₂ is cyclobutyl, cyclopentyl, cyclohexyl, cycloheptyl cyclooctyl, cyclononyl, cycloalkylalkyl of 5 to 10 carbon atoms, bicycloalkyl of 7 through 10 carbon atoms, and tricycloalkyl of 10 through 11 carbon atoms.

Preferred compounds of this case include N-acetyl-cis-4-cyclohexylmethylcyclohexylamine and N-acetyl-cis-4-cyclobutylmethylcyclohexylamine.

3. Knowles U.S. pat. application Ser. No. 634,037, filed Apr. 20, 1967, entitled "Certain Cyclohexylformamidines" now U.S. Pat. No. 3,678,109, describes cyclohexylformamidines of the formula:

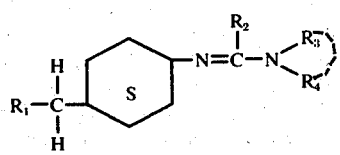

where
R₁ is alkyl of 3 through 8 carbon atoms, cycloalkyl of 4 through 9 carbon atoms, cycloalkylalkyl of 5 through 10 carbon atoms, bicycloalkyl of 7 through 10 carbon atoms or tricycloalkyl of 10 through 11 carbon atoms, R₂ is hydrogen or alkyl containing 1 through 3 carbon atoms, R₃ is alkyl containing 1 through 4 carbon atoms, and R₄ is alkyl containing 1 through 4 carbon atoms and can be joined with R₃ to form a saturated hydrocarbon ring as indicated by the dotted line in the formula.

A preferred compound of the class is N,N-dimethyl-N'-(4-cyclohexylmethylcyclohexyl) formamidine.

4. Knowles U.S. pat. application Ser. No. 634,417, filed Apr. 20, 1967, entitled "N-Acetyl-4-cycloalkloxy-clohexylamides", now U.S. Pat. No. 3,683,022, describes N-acetyl-4-cycloalkyloxycyclohexylamines of the formula:

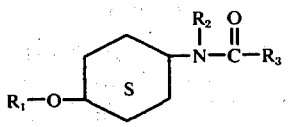

where
R₁ is cycloalkyl containing 4 through 9 carbon atoms,
R₂ is hydrogen or alkyl containing 1 through 3 carbon atoms, and
R₃ is hydrogen or alkyl containing 1 through 3 carbon atoms.

Preferred within the above class is the cis isomer of N-acetyl-4-cyclohexyloxycylohexylamine.

5. Knowles U.S. pat. application Ser. No. 635,303, filed Apr. 20, 1967, entitled "Certain 2-(4-substituted cyclohexylamino)-2-oxazolines", now U.S. Pat. No. 3,679,805, describes 2-(4-substituted cyclohexylamino)-2-oxazolines of the formula:

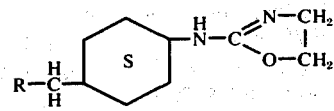

where
R is alkyl of 3 through 8 carbon atoms, cycloalkyl of 4 through 9 carbon atoms, cycloalkylalkyl of 5 through 10 carbon atoms, bicycloalkyl of 7 through 10 carbon atoms, or tricycloalkyl of 10 through 11 carbon atoms.

A preferred compound within the class is 2-(cis-4-cyclohexylmethylcyclohexylamino)-2-oxazoline.

6. Knowles U.S. pat. application Ser. No. 635,302, filed Apr. 20, 1967, now U.S. Pat. No. 3,683,007, describes compounds of the formula:

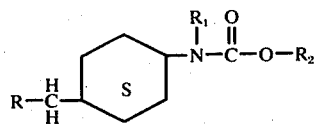

where
R is selected from the group consisting of alkyl of 3 through 8 carbon atoms, cycloalkyl of 4 through 9 carbon atoms, cycloalkylalkyl of 5 through 10 carbon atoms, bicycloalkyl of 7 through 10 carbon atoms, and tricycloalkyl of 10 through 11 carbon atoms;

R₁ is selected from the group consisting of hydrogen and alkyl of 1 through 3 carbon atoms; and R₂ is alkyl of 1 through 3 carbon atoms.

A preferred compound within the class is methyl-N-(cis-4-cyclohexylmethylcyclohexyl) carbamate.

7. Knowles U.S. pat. application Ser. No. 635,301, filed Apr. 20, 1967, now U.S. Pat. No. 3,686,303, describes compounds of the formula:

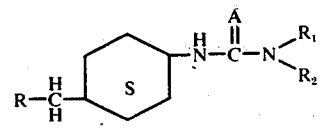

where
R is selected from the group consisting of alkyl of 3 through 8 carbon atoms, cycloalkyl of 4 through 9 carbon atoms, cycloalkylalkyl of 5 through 10 carbon atoms, bicycloalkyl of 7 through 10 carbon atoms, and tricycloalkyl of 10 through 11 carbon atoms;

R₁ and R₂ are separately selected from the group consisting of hydrogen, alkyl of 1 through 4 carbon atoms, cyanoalkyl of 1 through 4 carbon atoms, nitroalkyl of 1 through 4 carbon atoms, alkoxyalkyl of 1 through 4 carbon atoms in the alkoxy and 1 through 4 carbon atoms in the alkyl and thioalkoxyalkyl of 1 through 4 carbon atoms in the thioalkoxy and 1 through 4 carbon atoms in the alkyl; and A is selected from the group consisting of oxygen and sulfur.

A preferred compound within the class is 1-(cis-4-cyclohexylmethylcyclohexyl)-3-methylurea.

8. Knowles U.S. pat. application Ser. No. 635,307, filed Apr. 20, 1967, now U.S. Pat. No. 3,683,001, describes compounds of the formula:

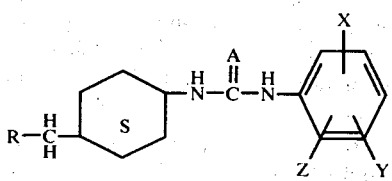

where
A is selected from the group consisting of oxygen and sulfur;
R is selected from the group consisting of alkyl of 3 through 8 carbon atoms, cycloalkyl of 4 through 9 carbon atoms, cycloalkylalkyl of 5 through 10 carbon atoms, bicycloalkyl of 7 through 10 carbon atoms and tricycloalkyl of 10 through 11 carbon atoms;
X, Y and Z are separately selected from the group consisting of hydrogen halogen, nitro, alkyl of 1 through 3 carbon atoms, trifluoromethyl, cyano and alkoxy of 1 through 3 carbon atoms.

A preferred compound of the class is 1-phenyl-3-(cis-4-cyclohexylmethylcyclohexyl)urea.

9. Knowles U.S. pat. application Ser. No. 775,563, filed Nov. 13, 1968, now U.S. Pat. No. 3,686,255, describes compounds of the formula:

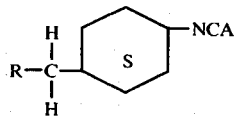

where
A is selected from the group consisting of oxygen and sulfur; and
R is selected from the group consisting of alkyl of 3 through 8 carbon atoms, cycloalkyl of 4 through 9 carbon atoms, cycloalkylalkyl of 5 through 10 carbon atoms, bicycloalkyl of 7 through 10 carbon atoms, and tricycloalkyl of 10 through 11 carbon atoms.

A preferred compound of the class is 4-cyclohexylmethylcyclohexylisothiocyanate.

In order to produce the desired atmospheric level of the chemical heat and fire alarm, the compounds will have to be incorporated into the various combustible substrates at levels ranging from 0.0001 to 1% based on the total weight of the combustible material in the finished article. Typical substrates into which the chemical alarms can be incorporated are carpet backings, carpet underlays, upholstery, cushions, padding, mattress stuffing, pillow stuffing, building insulation, electrical insulation, paint, ceiling tile and housings for electrical devices. During the time when these materials are exposed to excessive heat or smoldering the chemical alarm would be released.

Other embodiments of the chemical fire alarms are also possible. Thus the substrate could be a glue which is used to paste paper onto wall board or walls. Or the chemicals could be incorporated into a resinous material and placed in a room. The heat from a fire in the room would release the chemical.

Another desirable property of the chemical fire alarm compounds is their compatibility with the materials used in the substrates mentioned above. The compounds listed above would be resistant to removal by washing or to localized concentration buildups as a result of gradual migration during periods of high humidity.

The respiratory irritants can be incorporated into the substrate in any convenient manner. Thus they can be incorporated by coating or impregnating the substrate with a solution of the irritant. They can also be incorporated during the manufacture of substrate, i.e., being added to the premix of a material to be foamed. The only requirement is that the method used not reduce the activity of the irritant to such a level that it is no longer useful.

Finished articles such as carpet backings, cushions, upholstery, mattresses, wall and ceiling tile and the like can be treated with the fire alarm chemical by either spot treating with a solution of the alarm chemical or by the insertion of plugs of the same substrate which have been treated with the alarm chemicals.

Fire alarm paints can be used in areas such as on motors and in duct work to serve as an overheating warning system.

Cable and wire coverings could be impregnated with the fire alarm chemicals which would be liberated in the event of accidental overheating. Housing devices for electrical components, such as the on-off switch in TV sets, could be impregnated with the alarm chemicals to warn of dangerous overheating.

Plastic or wooden devices can be impregnated with the alarm chemicals. This device can then be hung in strategic locations such as furnace rooms or kitchens. When these devices are exposed to excessive heat, the alarm chemical is released thereby warning people of the hazardous situation.

The following examples more fully define this invention. They will show how to prepare substrates containing the chemical alarms. They also show how these substrates behave in a burning situation. A test method is also described which can be used to screen for useful chemical alarm compounds. In the Examples, all percentages are percent by weight.

EXAMPLE 1

A 6,6 nylon (bulk, continuous filament), shag, greige carpet was made by tufting the nylon yarn into Typar (a non-woven polyethylene backing). The backs of carpet samples measuring about 20 × 20 cm. and weighing about 40g. were painted with a standard carpet backing formulation (Vulcanol 6676 latex) to which was added cis-N-acetyl-4-cyclohexylmethycyclohexylamine.

"Vulcanol" 6676 is an aqueous slurry containing 70% solids which in turn consist of 100 parts of a styrenebutadiene rubber latex, and 250 parts whiting.

The carpet backing formulation application referred to hereafter as latex formulation was such that about 40g. was applied to each 20 × 20 cm. carpet sample. The latex formulation for each carpet sample was treated with a different level of the cis-N-acetyl-4-cyclohexylmethylcyclohexlamine. Carpet samples were prepared containing 0.81, 0.081, 0.0081, and 0.00081% cis-N-acetyl-4-cyclohexylmethylcyclohexylamine in the latex carpet backing. The latex formulation containing these levels were prepared by adding 23.8 g. of a 4.2% dimethylformamide solution of the cis-N-acetyl-4-cyclohexylmethylcyclohexylamine to 100 g. of the Vulcanol 6676 in a Waring Blender for 1 minute. This produced latex backing material containing 0.81% cis-N-acetyl-4-cyclohexylmethylcyclohexylamine. A 40 g. sample of the backing formulation was applied to the back of a 20 × 20 cm. sample of greige carpet; this is equivalent to an application level of 28 oz./yd.$^2$ of carpet. The treated carpet was then allowed to dry at room temperature for 2 days.

A 10 g. sample of the 0.81% latex formulation prepared above was added to 90 g. of fresh Vulcanol 6676; the mixture was stirred with a Waring Blender for 1 minute. This mixture had a 0.081% concentration of cis-N-acetyl-4-cyclohexylmethylcyclohexylamine. A 40 g. sample of this mixture was then painted onto the back of a fresh 20 × 20 cm. piece of greige carpet, and dried at room temperature for 2 days.

A 10 g. sample of the 0.081% latex mixture from above was added to 90 g. of fresh Vulcanol 6676; the mixture was stirred with a Waring Blender for 1 minute. This mixture had a 0.0081% concentration of cis-N-acetyl-4-cyclohexylmethylcyclohexylamine. A 40 g. sample of this mixture was then painted onto the back of a 20 × 20 cm. piece of greige carpet and dried at room temperature for 2 days.

A 10 g. sample of the 0.0081% latex mixture from above was added to 90 g. of fresh Vulcanol 6676; the mixture was stirred with a Waring Blender for 1 minute. This mixture had a 0.00081% concentration of cis-N-acetyl-4-cyclohexylmethylcyclohexylamine. A 40 g. sample of this mixture was then painted onto the back of a 20 × 20 cm. piece of greige carpet and dried at room temperature for 2 days.

A 15 × 40 mm. sample of each treated carpet was then burned by igniting the material with a small, bunsen burner flame and allowing the sample to burn in an aluminum dish. When the carpet burned with a flame, only small amounts of the irritant could be detected in the smoke. However, when the carpet samples were allowed to smolder, the irritant was detected in the smoke from all the carpet samples. The smoke produced a burning sensation in the nose and throat of humans who volunteered to inhale the smoke, causing them to cough and/or sneeze. The smoke from carpet samples backed with the same levels of Vulcanol 6676 did not produce the burning of the nose and throat.

This test clearly shows that the chemical fire alarm was activated by the smoldering carpet sample. This simple test can be conducted with other chemical compounds to determine if they are suitable respiratory irritants.

EXAMPLE 2

A series of 30 × 70 mm. polyethylene sheeting samples was painted with Vulcanol 6676 containing various levels of o-chlorobenzylidene malononitrile. One g. of o-chlorobenzylidene malononitrile was blended into 99 g. of Vulcanol 6676 making a 1% mixture. Ten gram of this formulation was added to 90 g. fresh Vulcanol 6676 to make a 0.1% mixture. This procedure was repeated to make 0.01 and 0.001% mixtures.

When the polyethylene samples were burned, the fire alarm chemical could be detected in the smoke at all levels by the humans who volunteered to inhale the smoke.

EXAMPLE 3

Carpet samples similar to those in Example 1 are prepared by substituting equivalent amounts of o-chlorobenzylidene malononitrile for the cis-N-acetyl-4-cyclohexylmethylcyclohexylamine. The chemical fire alarm can be detected in the smoke of the smoldering carpet.

EXAMPLE 4

Carpet samples similar to those in Example 1 are prepared by the substitution of equivalent amounts of capsaicin for the cis-N-acetyl-4-cyclohexylmethylcyclohexylamine. The chemical fire alarm can be detected in the smoke of the smoldering carpet.

EXAMPLE 5

A polyurethane seat cushion is prepared by adding cis-N-acetyl-4-cyclohexylmethylcyclohexylamine to the glycol portion of the urethane premix. When the urethane foam is prepared, the chemical fire alarm is evenly distributed throughout the cushion. The chemical fire alarm is then ready for release in the event of a fire.

EXAMPLE 6

The chemical fire alarm can be applied to upholstery cushions, mattress stuffing or insulation by spraying a solution of the chemical fire alarm in dimethylformamide (DMF) or acetone onto the substrate, and drying the impregnated material.

A solution of cis-N-acetyl-4-cyclohexylmethylcyclohexylamine in DMF is sprayed onto cotton batting for use in either upholstery or mattresses. The solvent is dried leaving the chemical fire alarm impregnated into the batting fibers. The treated batting is then covered in the process of finishing the desired upholstered or bedding article. The chemical fire alarm is then ready for release in the event of a fire.

EXAMPLE 7

The cotton fabric used as insulation in electrical wires is treated with cis-N-acetyl-4-cyclohexylmethylcyclohexylamine dissolved in DMF according to the method of Example 5. The dried fabric is then incorporated into electrical wiring. The chemical fire alarm is then ready for release in the event of a fire.

As can be seen by reference to the preceding examples and the other embodiments discussed hereinabove, the vaporizable organic compound is bound to the substrate in such manner that, under conditions of normal use, it remains bound to the substrate but becomes vaporized from the surface of the substrate upon exposure to abnormally high temperatures. In general, the methods by which the organic compound is bound to the substrate fall into two categories: (1) by incorporation within the substrate structure; and (2) by coating upon the substrate in admixture with a binder which is adherent to the substrate.

For example, in the case of carpet backing, upholstery backing, carpet underlays, rubber cushions and pillows and electrical insulation, the organic compound can be dispersed in a latex of the polymeric substrate material and thus incorporated within a matrix of the substrate polymer when the latex is converted to a solid substrate. In the case of porous substrates such as certain textiles paper, wood, padding, stuffing and building insulation materials, the compound can be incorporated by immersing the material in a liquid solution or other dispersion of the organic compound. Upon removal of the carrier liquid, the organic compound becomes enmeshed and therefore bound within the interstices of the porous substrate. In some instances, e.g., pillows, mattresses and upholstery padding, the porous substrate may also have a covering which confines the substrate and/or functions as a protective covering.

On the other hand, examples of the coating method of binding the organic compound include wallpaper coated with glue or paste containing the organic compound and non-porous surfaces, e.g. metal electrical housings, filled or close-grained woods, painted surfaces, plastics and the like, coated with a layer of adherent paint in which the organic compound is dispersed. Like the above-mentioned porous substrates, the binders in such coatings are generally either natural or synthetic polymers. In some instances, such as when the organic compound is admixed into latices which are used for rug backings, the method of incorporating the organic compound may include both of the above-mentioned categories.

I claim:

1. A heat-activated chemical fire and heat alarm for warning humans of a fire hazard comprising
   a. a flammable solid substrate having bound thereto
   b. 0.0001–1.0% by weight, basis weight of the substrate, of a non-vaporous organic compound having a molecular weight no greater than about 400 which becomes vaporized upon being heated to a temperature no lower than about 200° C and forms in air at a concentration of 100 ppm or less a respiratory mucous membrane irritant, the organic compound being bound to the substrate in non-vaporous form under normal conditions of use, but is vaporized from the surface of the substrate upon exposure to a temperature no lower than about 200° C.

2. The chemical fire and heat alarm of claim 1 in which the organic compound is bound to the substrate by incorporation within the substrate structure.

3. The chemical fire and heat alarm of claim 1 in which the organic compound is bound to the substrate by coating it upon the substrate in admixture with a binder.

4. The alarm of claim 1 in which the organic compound is a volatile liquid having a molecular weight below about 150 encapsulated within a normally solid barrier from which the compound is released at a temperature no lower than about 200° C.

5. The chemical fire and heat alarm of claim 1 in which the organic compound is an N-acyl-cis-4-higher alkyl-substituted cyclohexylamine corresponding to the structure

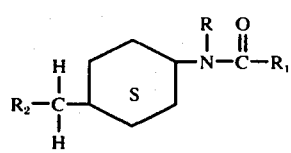

wherein R is hydrogen, methyl or ethyl, $R_1$ is hydrogen or $C_{1-4}$ alkyl and $R_2$ is $C_{3-8}$ alkyl.

6. The chemical fire and heat alarm of claim 5 in which $R_2$ is a cyclic alkyl group selected from the group consisting of unsubstituted $C_{4-9}$ cycloalkyl, $C_{5-10}$ alkyl-substituted cycloalkyl, $C_{7-10}$ bicycloakyl and $C_{10-11}$ tricycloalkyl.

7. The chemical fire and heat alarm of claim 6 in which the organic compound is N-acetyl-cis-4-cyclohexylmethylcyclohexylamine.

8. The chemical fire and heat alarm of claim 1 in which the organic compound is the cis isomer of a cyclohexylformamidine corresponding to the structure

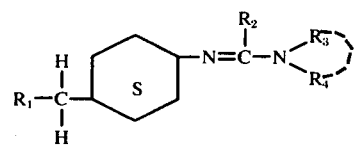

wherein $R_1$ is selected from the group consisting of $C_{3-8}$ alkyl, $C_{4-9}$ cycloalkyl, $C_{5-10}$ cycloalkylalkyl, $C_{7-10}$ bicycloalkyl and $C_{10-11}$ tricycloalkyl, $R_2$ is hydrogen or $C_{1-3}$ alkyl, $R_3$ is a $C_{1-4}$ alkyl and $R_4$ is $C_{1-4}$ alkyl which when joined with $R_3$ forms a saturated hydrocarbon ring.

9. The chemical fire and heat alarm of claim 1 in which the organic compound is a cis isomer of a compound corresponding to the structure

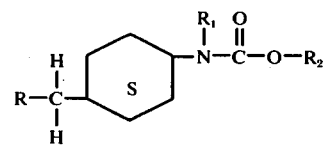

wherein R is selected from the group consisting of $C_{3-8}$ alkyl, $C_{4-9}$ cycloalkyl, $C_{5-10}$ cycloalkylalkyl, $C_{7-10}$ bicycloalkyl and $C_{10-11}$ tricycloalkyl, $R_1$ is hydrogen or $C_{1-3}$ alkyl and $R_2$ is $C_{1-3}$ alkyl.

10. The chemical fire and heat alarm of claim 1 in which the organic compound is a cis isomer of a compound corresponding to the structure

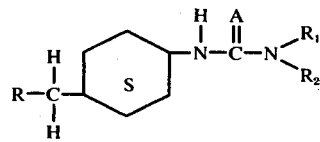

wherein R is selected from the group consisting of $C_{3-8}$ alkyl, $C_{4-9}$ cycloalkyl, $C_{5-10}$ cycloalkylalkyl, $C_{7-10}$ bicycloalkyl and $C_{10-11}$ tricycloalkyl, $R_1$ and $R_2$ are separately hydrogen or a $C_{1-4}$ alkyl group selected from the group consisting of alkyl, cyanoalkyl, nitroalkyl, alkoxyalkyl in which the alkoxy portion contains 1–4 carbon atoms and thioalkoxyalkyl in which the alkoxy portion contains 1–4 carbon atoms and A is either sulfur or oxygen.

11. The chemical fire and heat alarm of claim 1 in which the organic compound is a cis isomer of a compound corresponding to the structure

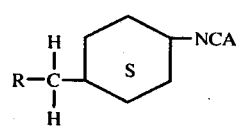

wherein R is selected from the group consisting of $C_{3-8}$ alkyl, $C_{4-9}$ cycloalkyl, $C_{5-10}$ cycloalkylalkyl, $C_{7-10}$ bicycloalkyl and $C_{10-11}$ tricycloalkyl and A is either sulfur or oxygen.

* * * * *